… [11] 3,937,585

United States Patent [19]
Cattermole

[45] Feb. 10, 1976

[54] PARTIALLY ROTATED FASTENER

[75] Inventor: David Christopher Cattermole, Enfield, England

[73] Assignee: Elliott Brothers (London) Limited, Chelmsford, England

[22] Filed: Sept. 29, 1972

[21] Appl. No.: 293,342

[30] Foreign Application Priority Data
Nov. 30, 1971 United Kingdom............ 55510/71

[52] U.S. Cl. .............. 403/300; 403/321; 403/332; 251/148; 292/341; 339/75 R; 339/118 RY; 333/98 R
[51] Int. Cl. ...................... F16b 5/00; F16b 21/02
[58] Field of Search...... 24/205.17, 221 R, 265 WS, 24/211, 201 HP, 201 HE, 249 PP; 292/341; 403/409, 350, 384, 387, 343, 14, 19, 44, 46, 315, 319, 344, 300, 321, 322, 332; 251/248; 137/798

[56] References Cited
UNITED STATES PATENTS

| 904,442 | 11/1908 | Mayer | 403/409 X |
|---|---|---|---|
| 2,509,669 | 5/1950 | Borst | 24/201 R |
| 3,443,827 | 5/1969 | Acker et al. | 24/201 R X |
| 3,664,559 | 5/1972 | Bruner | 24/265 WS X |

FOREIGN PATENTS OR APPLICATIONS 1,239,260  7/1971  United Kingdom

Primary Examiner—William R. Cline

[57] ABSTRACT

A partially rotated arrangement fastens parts together in nearly perfect alignment. The fasteners utilize semi-circular rings which are rotated about the circular axis until each ring lies partly in each of two adjacent parts. The parts so joined together may contain one or more fluid passages or form electric conductors, and more particularly, wave guides.

5 Claims, 39 Drawing Figures

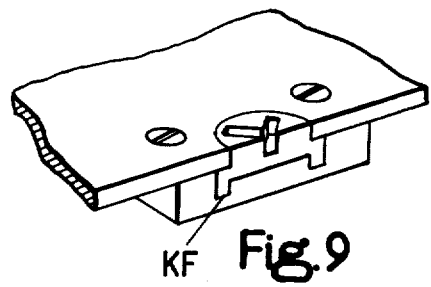
Fig.9 KF
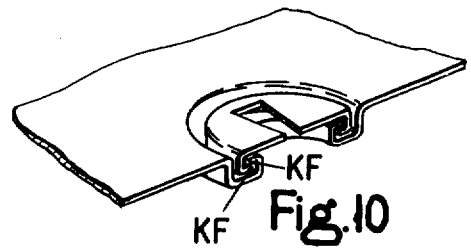
Fig.10 KF KF
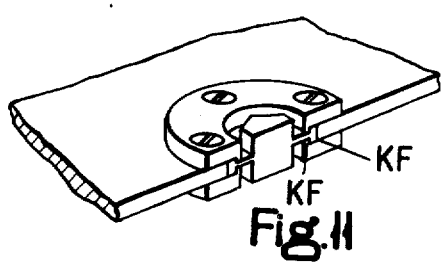
Fig.11 KF KF
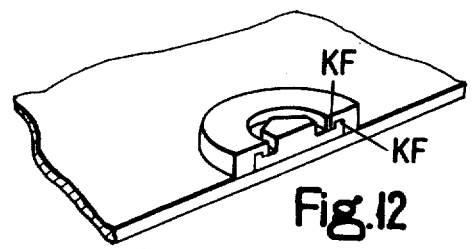
Fig.12 KF KF

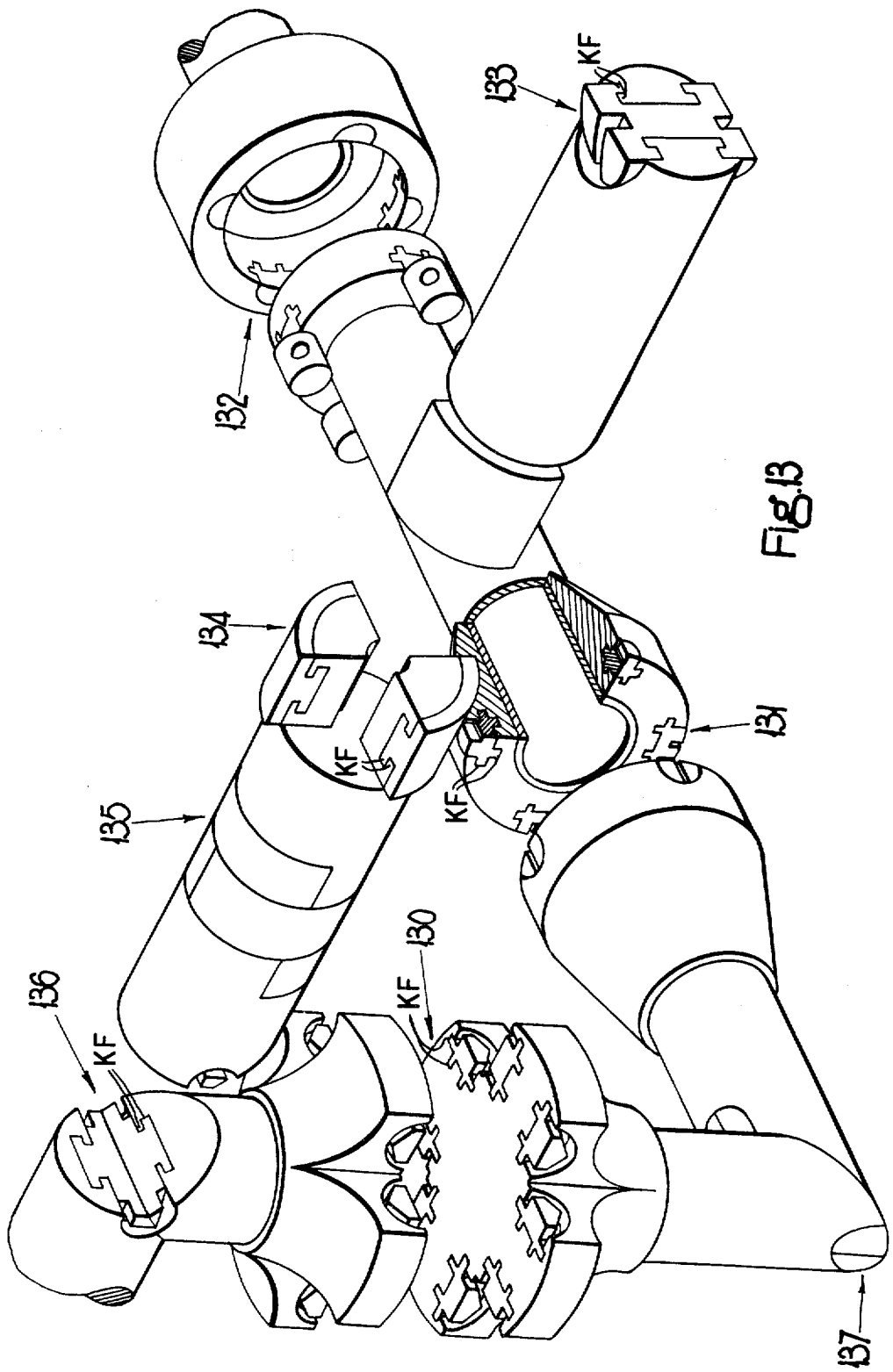

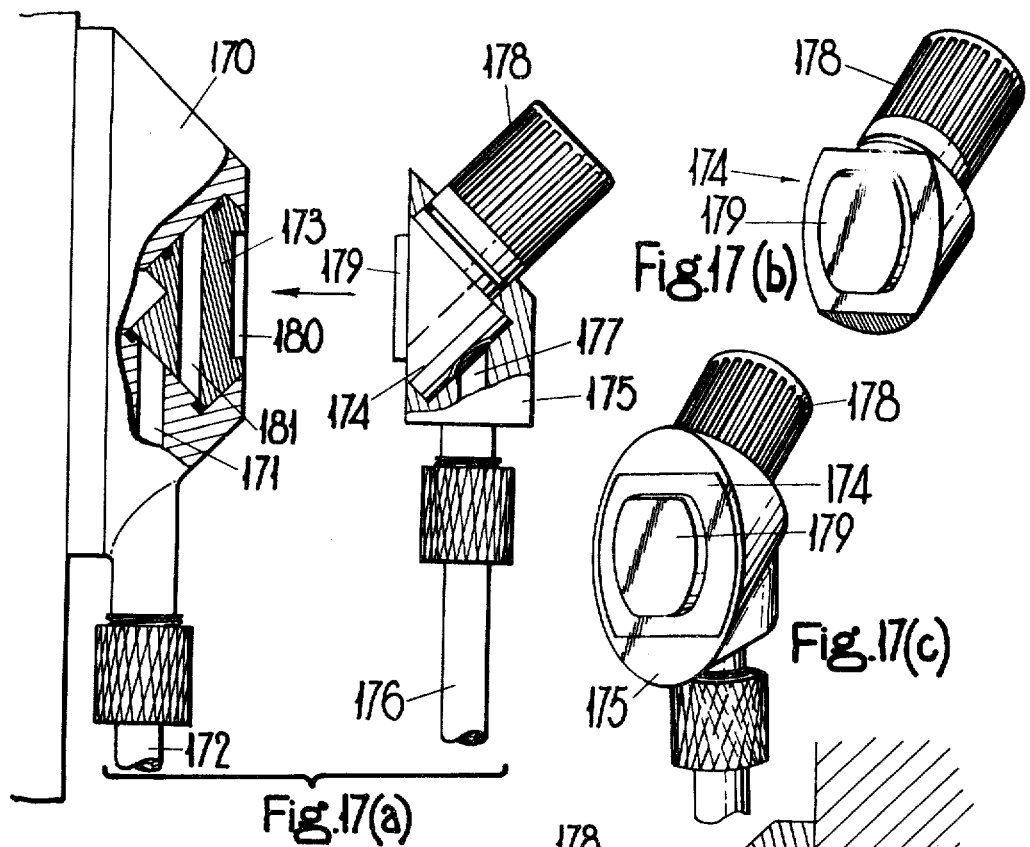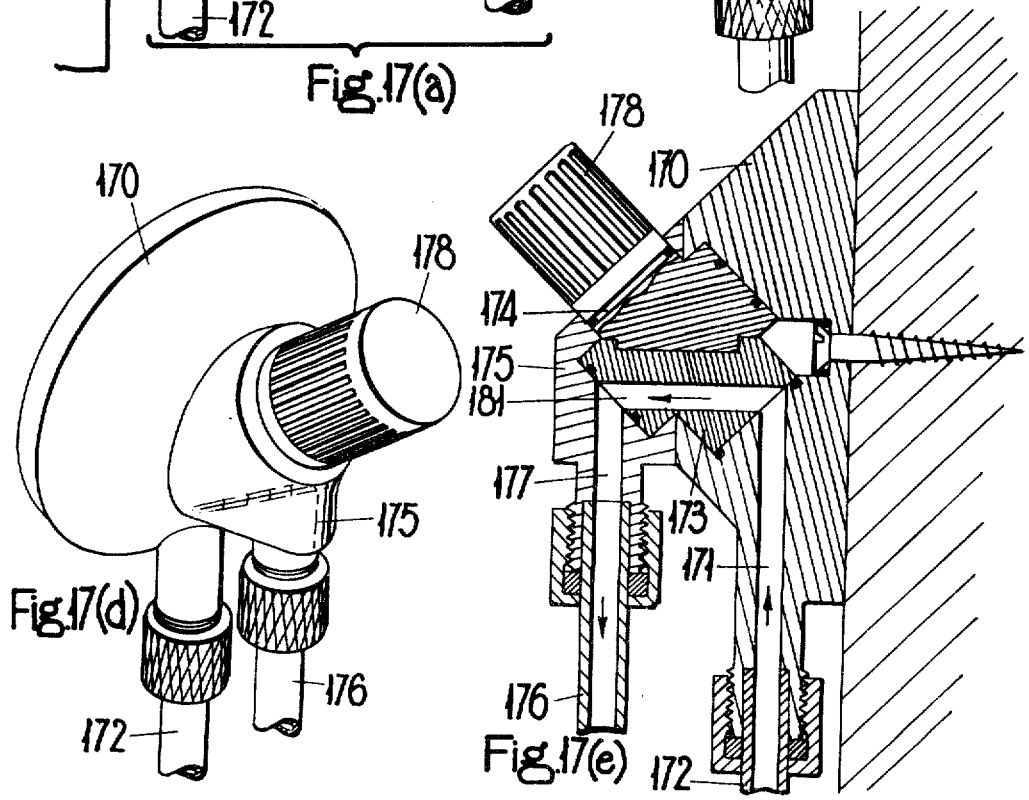

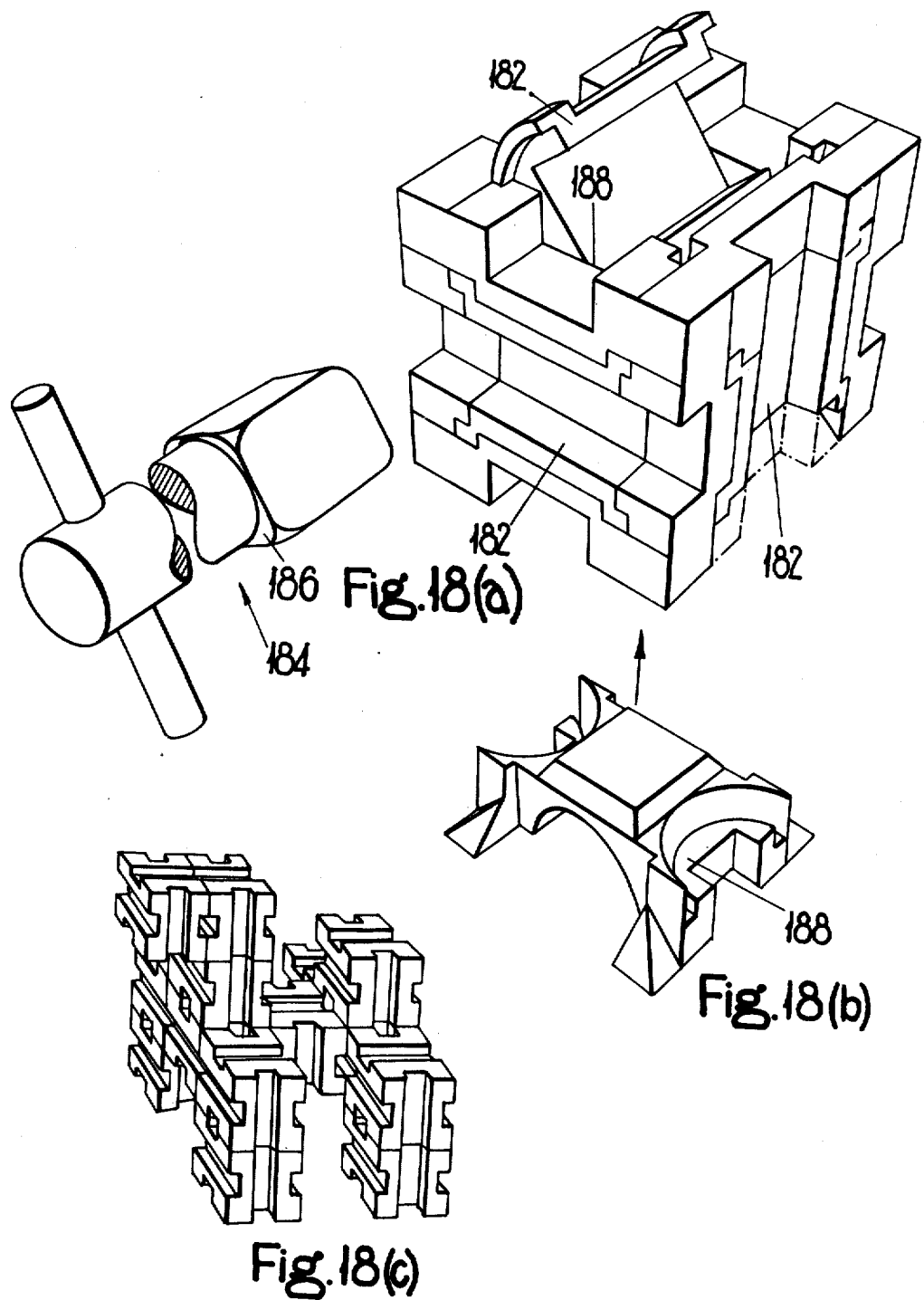

PARTIALLY ROTATED FASTENER

This invention relates to fastening arrangements, and more particularly to half-turn arrangements for fastening together two or more juxtaposed parts.

Very often it is necessary or desirable to quickly assemble one or more parts in nearly perfect alignment. There are many places where such assembled parts may be used. However, by way of example, a microwave guide or certain fluid conduits illustrate needs for these aligned parts. A number of wave guide or conduit sections must be put together on site and in a custom-fit manner. If the interior is misaligned, there are sharp edges and abrupt walls to randomly reflect microwaves or cause eddy currents in flowing fluids. Either way, inefficiencies in transmission practically destroy the utility of the wave guide or conduit.

Heretofore, it has been necessary for the on-site installer to spend an undue amount of time assembling these guides or conduits. Therefore, there is a clear and pressing need for the kind of fasteners which enable parts to be brought together and secured in nearly perfect alignment with a single, quick turn of a fastener.

Accordingly, an object of the invention is to provide new and improved half-turn fasteners. Here an object is to provide fasteners which lock parts together in good alignment responsive to a single half-turn. In this connection, an object is to provide a locking fastener which cannot be removed until after it is unlocked.

According to a first aspect of the invention, an arrangement for mutually fastening two or more juxtaposed parts comprises a body which is arranged to link the two parts after a single half-turn. The body is divided into two semicircular sections which rotate along a surface of corresponding shape lying between two or more juxtaposed parts. The body is rotatable a half-turn so that in one position, the ends of the semicircular sections are substantially aligned with the edge surfaces of the parts, and when rotated a half-turn therefrom, each section bridges the parts and links them together. Preferably, the cross section of the body is such that the parts may be fastened together in nearly perfect alignment and secured against mutual motion in any direction. The body may be divided by a plane surface which may either include the axis of rotation, or be transverse thereto. Or it may be displaced therefrom and include a line parallel to said axis.

Each of the fastener sections is preferably captivated in both of the respective parts.

The parts may also include a locking mechanism such that a key is required for rotation of the parts.

One or more passages may be formed in the fastener sections so that, when the sections are rotated, the passage or passages are aligned with and couple passages in the joined parts, thereby to permit the passage of fluid, or of solid objects. For example, the passage may be used for placing radioactive objects into a container. This embodiment of the invention may also be utilised (with suitable sealing) as a vacuum lock, e.g. in electron microscope specimen stages or mass spectrometer sources. Preferably the arrangement is such that the passages in the parts are sealed off by the fasteners when they are in the rotational position in which the parts are not mutually fastened.

Alternatively or additionally one or more of the fasteners may include electrical conductors arranged to make electrical contact between respective electrical conductors in the parts when they are fastened together.

According to a second aspect of the invention, a fastening arrangement comprises first and second fixed sections and first and second movable sections which are rotatable with portions thereof sliding in arcuate guideways. The movable sections are carried by the fixed sections when the arrangement is unfastened. The arrangement is such that when fastened, the first and second fixed sections are in juxtaposition with the separate guideways in the two fixed sections, thereby forming a single composite guideway of circular or part-circular shape. The two movable sections form a composite rotatable body with portions of each of the first and second movable sections lying in the guideways in both the first and second fixed sections so as to secure the first and second fixed parts against relative movement in at least one direction. The arrangement, when fastened, being unfastenable by rotation of said composite body until said portions of the first and second movable sections are free of the guideways in the second and first fixed sections respectively.

The first and second fixed parts may be the objects to be fastened together or, alternatively, they may be adapted to be secured respectively to two other parts that are to be fastened by the arrangement.

Various embodiments of the invention will now be described, by way of example, with reference to the accompanying drawings wherein:

FIGS. 1(a) to 1(e) illustrate the fundamental principle of the present invention;

FIGS. 2(a) to 2(d) illustrate a simple practical embodiment of the invention;

Figure 6:
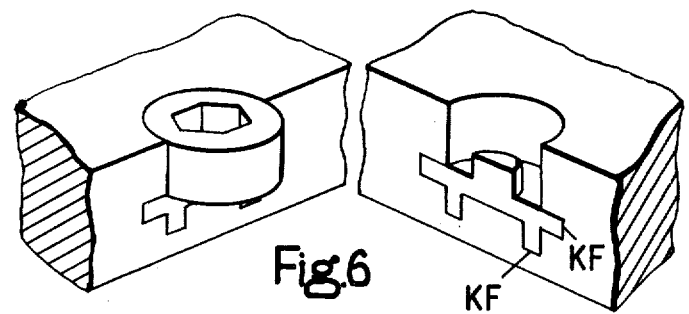
Figure 14:
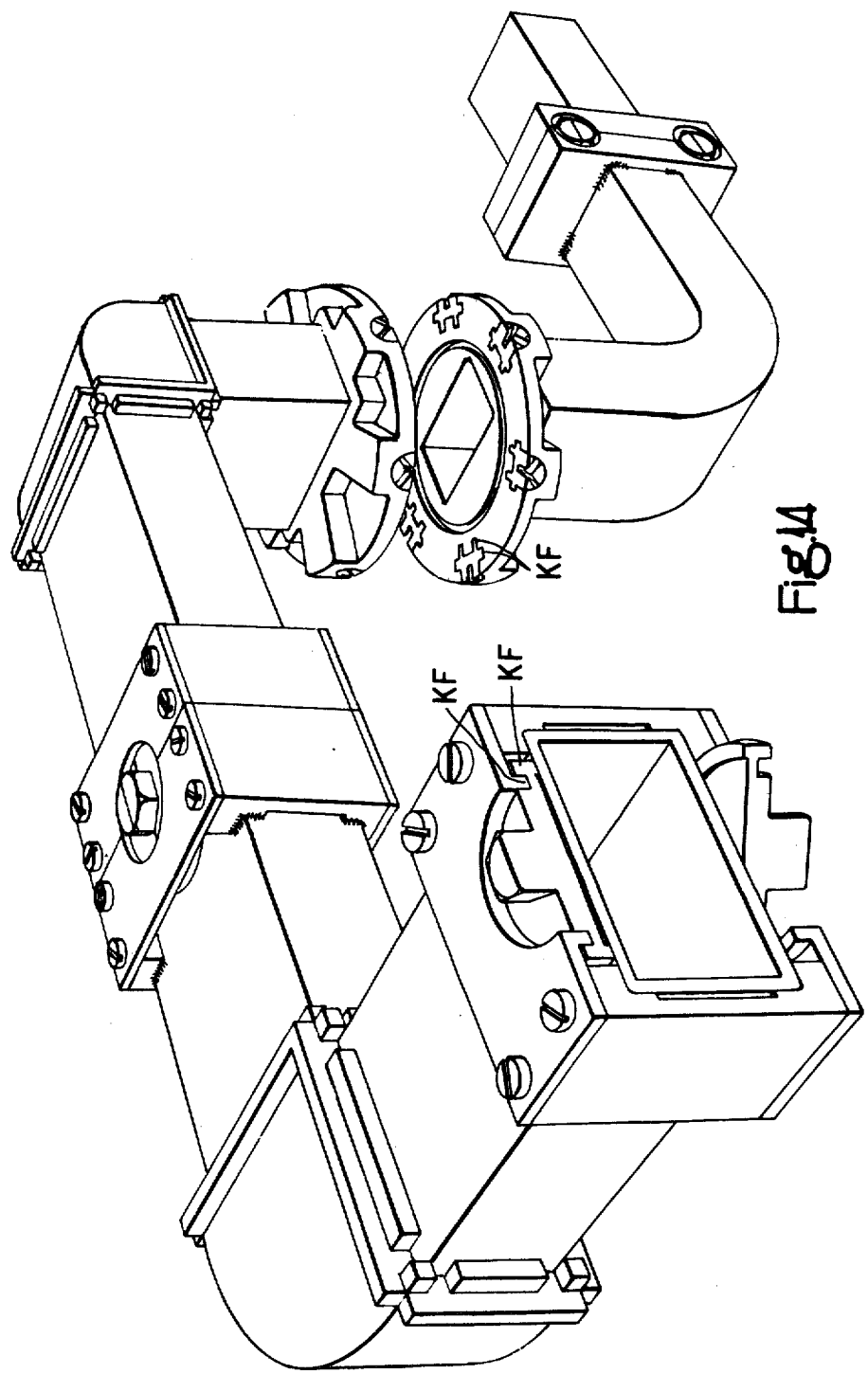
Figure 15A:
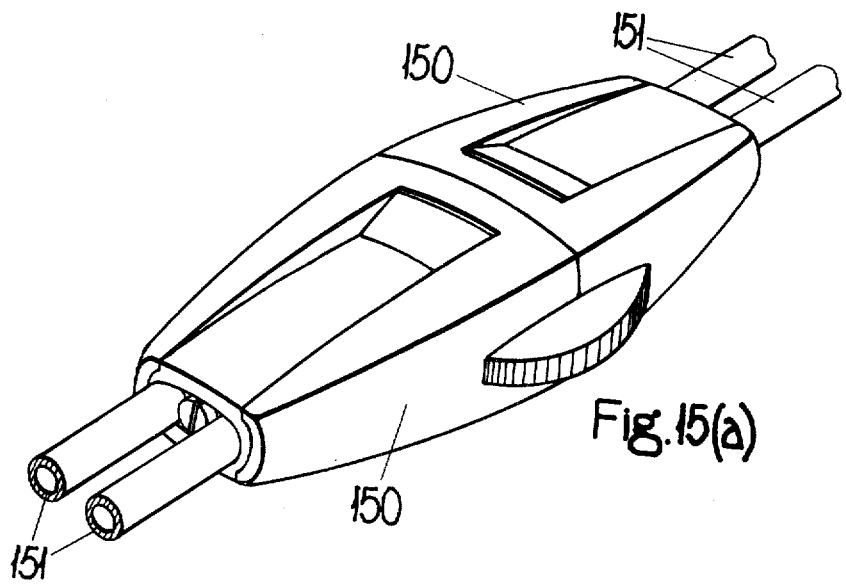
Figure 15B:
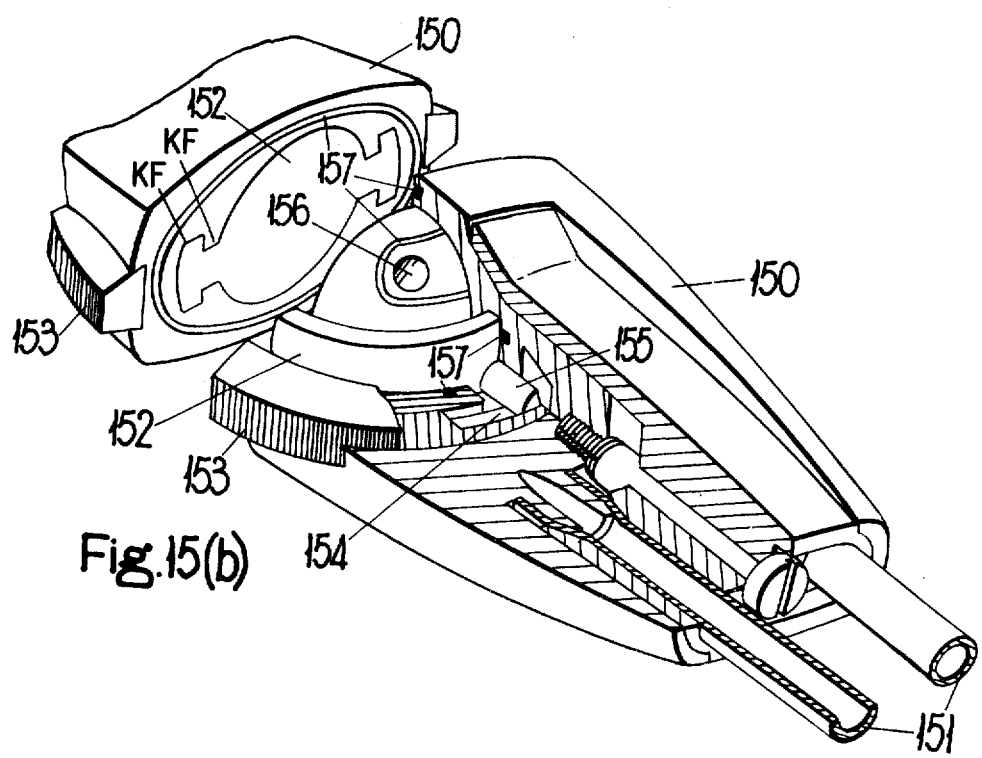
Figure 15C:
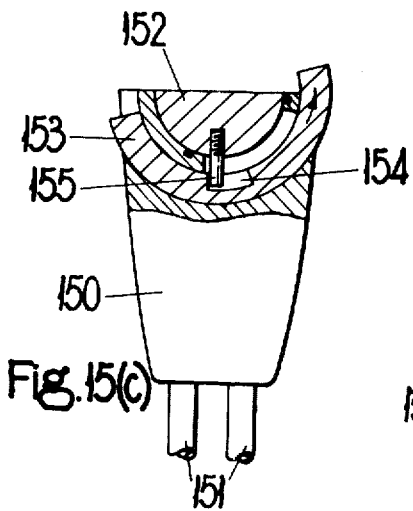
Figure 15D:
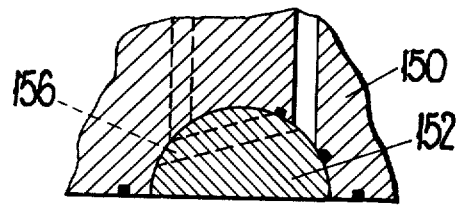
Figure 15E:
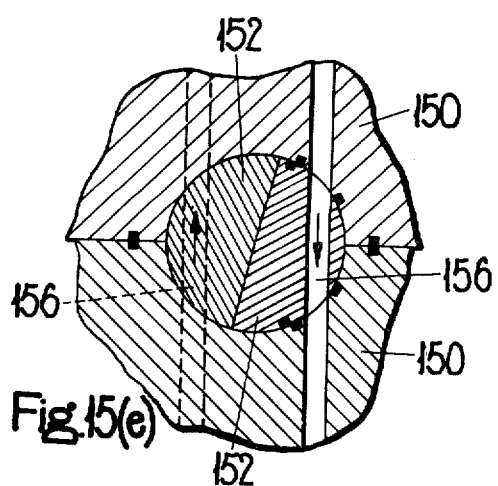
Figure 16A:
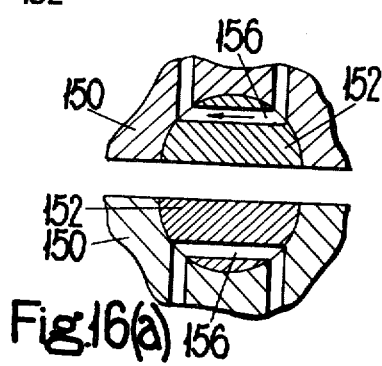
Figure 16B:
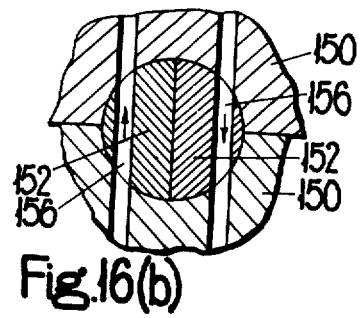

FIGS. 5(a) to 5(d) illustrate an embodiment incorporating a locking arrangement;

FIG. 6 illustrates another practical embodiment;

FIGS. 7–12 illustrate embodiments particularly suitable for fastening plates;

FIG. 13 illustrates embodiments particularly suitable for fastening tubes and rods;

FIG. 14 illustrates the application of the invention to the fastening of waveguide sections;

FIGS. 15 (a) and 15(e) illustrate a fluid coupling;

FIGS. 16 (a) and 16(b) illustrate a modification of FIG. 15;

FIGS. 17(a) – 17(e) illustrate another form of fluid coupling; and

FIGS. 18(a) – 18(c) illustrate the application of the invention of toy building blocks.

Figure 1A:
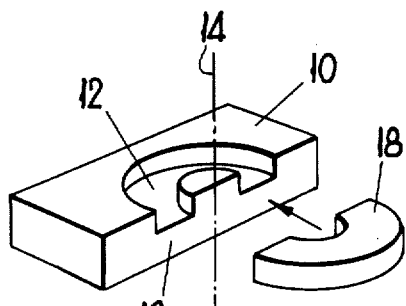

Referring first to FIG. 1(a), an object 10 which is to be fastened to a like object has formed therein a groove semicircular or raceway 12 whose internal surface defines part of an annular path of rotation having an axis of rotation 14 lying on the surface 16 of the object 10. A semicircular fastener part 18 has a form in the solid which conforms to the form of the semicircular path of rotation, defined by the groove 12. Thus, part 18 may rotate in the groove [FIG. 1(b)] until the ends of the part 18 are flush with the surface 16 [FIG. 1(c)]. If the object 10 with its part 12 is now juxtaposed with an identical object and part [FIG. 1(d)], the semicircular parts 18 may be rotated about their axis of rotation so that they move through abutting raceways 12, until the parts 18 link together both of the objects 10 [FIG. 1(e)]. Then, the two objects will be fastened together in nearly perfect alignment and secured against mutual motion in at least one direction [horizontal shear as shown in FIG. 1(e)].

From a consideration of FIG. 1, particularly FIG. 1 (d), it will be seen how the fastening arrangement 18 may be considered as a solid of rotation linking the two objects 10 into nearly perfect alignment. The linked object may also be thought of as being divided into two parts by the surface defined by the mating faces of the objects.

The arrangement of FIG. 1 is a simplistic approach, facilitating understanding of the principle involved. Since the objects are fastened against mutual movement in one direction only [horizontal shear in FIG. 1(e)] and for example may be readily separated by vertical shear, the arrangement of FIG. 1 has little practical utility.

The arrangement illustrated in FIG. 2 is more practicable in that it provides omnidirectional fastening. In FIG. 2(a), an object 20 which is to be fastened to a like object is formed with a groove 22 (corresponding to the groove 12) and a further groove 24 to accommodate a part 26 of a solid of rotation as shown in FIG. 2(b). FIG. 2(c) shows how the object 20 may be fastened to an identical object by suitable juxtaposition of the objects and rotation of the corresponding parts 26. FIG. 2(d) shows the object 20 and part 26 in cross-section to illustrate the substantial tolerances 28 which may be allowed without affecting the tightness and rigidity of the fastening arrangement.

In the annexed claims, it will be convenient to refer to a "key flange" in order to identify a part of the various fasteners. For easy identification, the letters "KF" are applied to the key flange in the various embodiments. The term "key flange" is intended to describe an annular fin which projects either horizontally or vertically (or both horizontally and vertically) from the body of a fastener. The annular fin fits within a correspondingly shaped raceway formed in a mating structure.

Figure 2A:
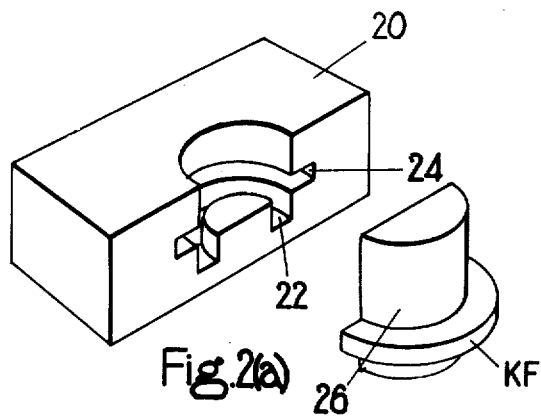
Figure 2B:
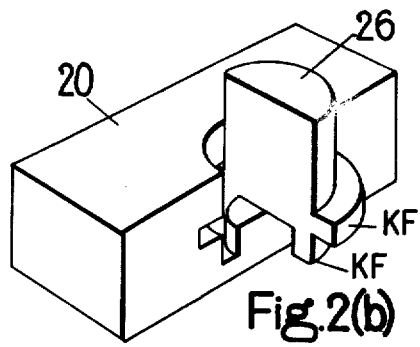
Figure 2C:
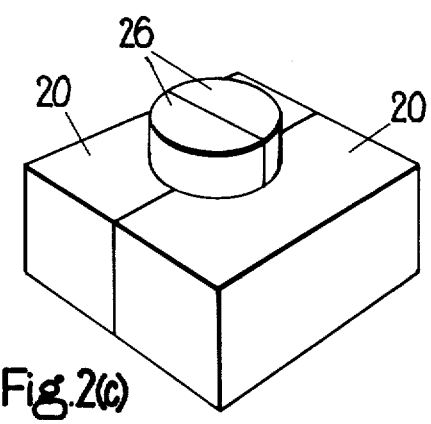
Figure 2D:
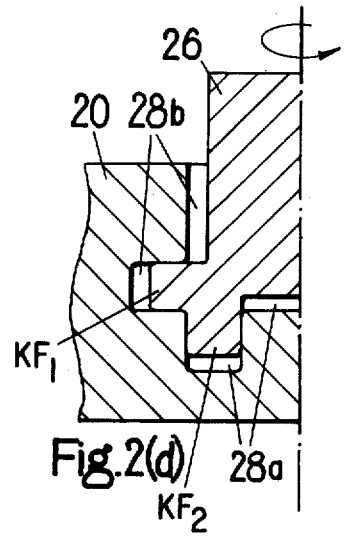

For example, FIG. 2(d) shows a horizontal key flange or annular fin $KF_1$ and a vertical key flange or annular fin $KF_2$, set at right angles with respect to each other. The horizontal key flange $KF_1$ tightly holds the locking body 26 in place despite the poor tolerance at 28a. Likewise, the key flange $KF_2$ tightly holds the body 26 in place despite the poor tolerance at 28b.

The key flange may take any of many different forms as shown at KF in the various figures. Therefore, the term "key flange" is to be construed broadly enough to cover any of these embodiments. On the other hand, the term "key flange" is intended to exclude various forms of tight tolerance locking devices such as screw threads, dove tail joints, and the like. One example of such an excluded dove tail joint is seen in FIG. 5 of British Pat. No. 1,239,260 (Even Marstrand, inventor).

Figure 1B:
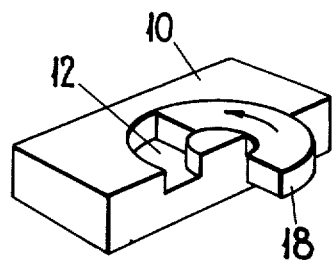
Figure 1C:
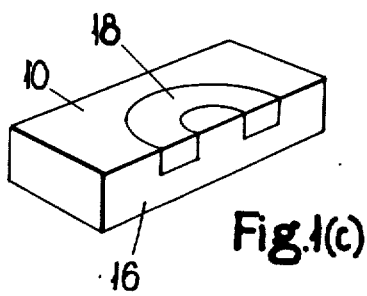
Figure 1D:
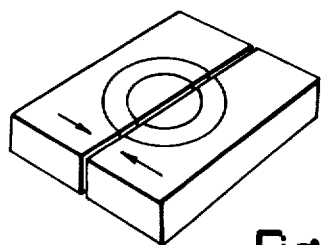
Figure 1E:
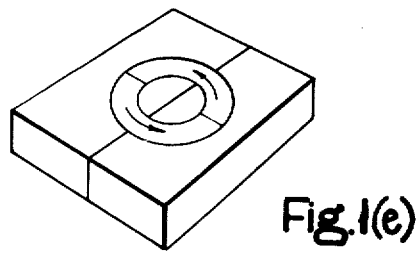

Also, for convenience of expression, the term "partial rotation" is used herein to describe the fastener movements depicted in FIGS. 1(a), 1(b). This motion could be described as a "quarter-turn" since the fastener body rotates by about 90°. This motion could also be described as a "half-turn fastener" since the fastener moves through half of its arc. It is thought that either term might be used equally well; however, there is also room to argue about the appropriateness of the term. Accordingly, the term "partial rotation" is adopted to avoid the arguments.

It may be observed that the formation of the required component shapes is straight-forward and can be undertaken by conventional machining techniques, or moulding, casting or sintering processes.

Figure 3A:
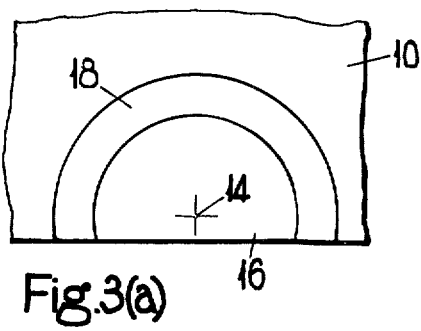
FIG. 3 illustrates a modification of FIG. 1 which enables extra-tight fastening of the objects.
Figure 3B:
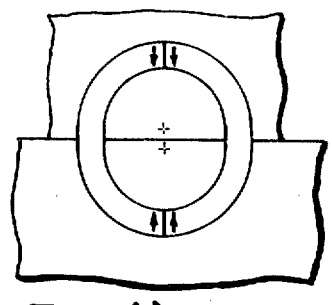

FIG. 3 shows a modification of the FIG. 1 arrangement in which the axis of rotation 14 is inwardly offset from the face 16 of the object 10 [FIG. 3(a)], and the part 18 modified accordingly. As shown in FIG. 3(b), the result is a substantial tension between the objects being fastened together. Apart from the obvious advantages of this, the resultant extra friction upon the parts 18 causes them to be effectively self-locking when in the fastening position.

Figure 4:
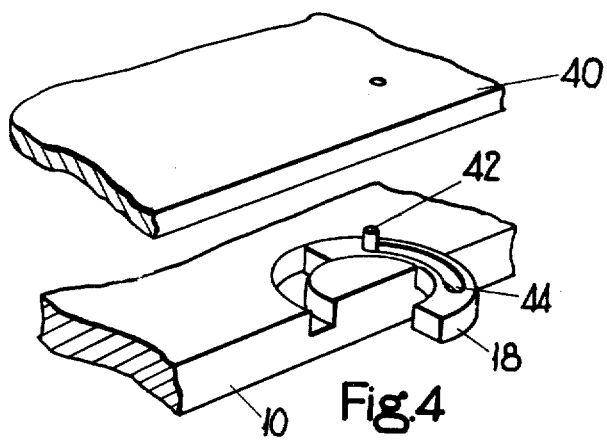
FIG. 4 illustrates another modification of FIG. 1 which enables captivation of the parts.
Figure 5A:
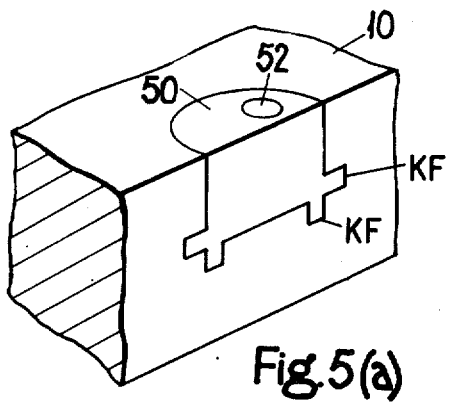
Figure 5B:
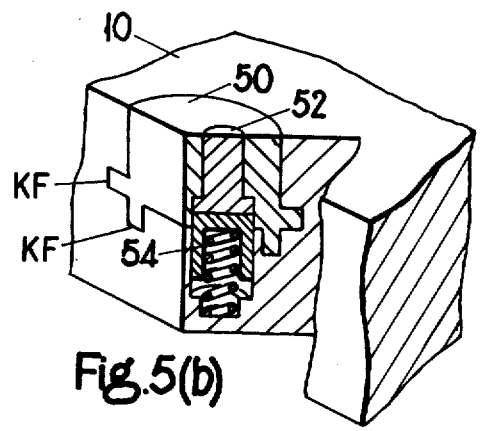
Figure 5C:
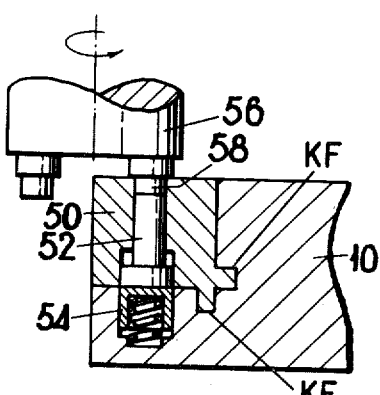
Figure 5D:
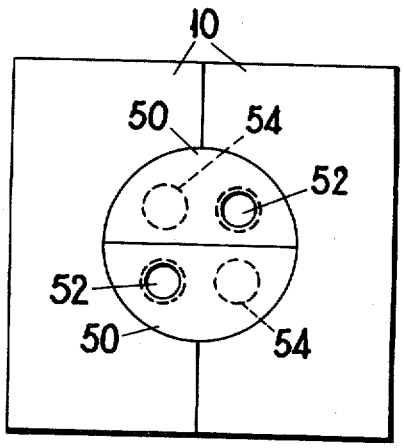

FIG. 4 shows another modification of the FIG. 1 arrangement for making the part 18 captive in the object 10. A cover plate 40 prevents removal of the part 18 in an axial direction, while a fixed pin 42 cooperating with a slot 44 in the part 10 prevents rotational removal of the part 18 from the block 10 while at the same time permitting the amount of rotation required for fastening and unfastening.

FIG. 5 shows an embodiment which incorporates a locking arrangement. FIG. 5(a) shows a perspective view of the arrangement, while FIG. 5(b) is shown partly in cross section. Basically, the part 50 (corresponding to the part 26 in FIG. 2) is provided with a plunger 52 aligned with a spring loaded detent 54 in the object 10. As may be seen from FIG. 5(c), a tool 56 having projection 58 of precisely the right length must be used in order to turn the part 50 into the fastening position. FIG. 5(d) shows a plan view of the two objects 10 fastened together. By having two plungers 52 in each part 50 and two detents 54 in each object 10, the arrangement can also be locked in the fastening position. If the plungers 52 have different lengths, different "combinations" of the projections 58 are possible. Therefore, only a tool 56 with any given "combination" can be used to operate a given fastening arrangement. A further advantage of the FIG. 5 arrangement is that is presents a smooth exterior [c.f. FIG. 2(c)].

FIG. 6 illustrates another "smooth exterior" arrangement which requires an Allen key for operation.

FIGS. 7 to 12 show various embodiments for fastening of two sheets.

Figure 7:
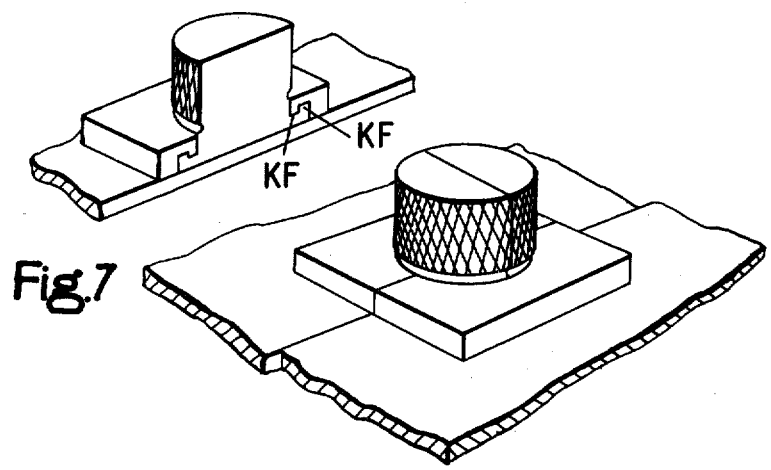
Figure 8:
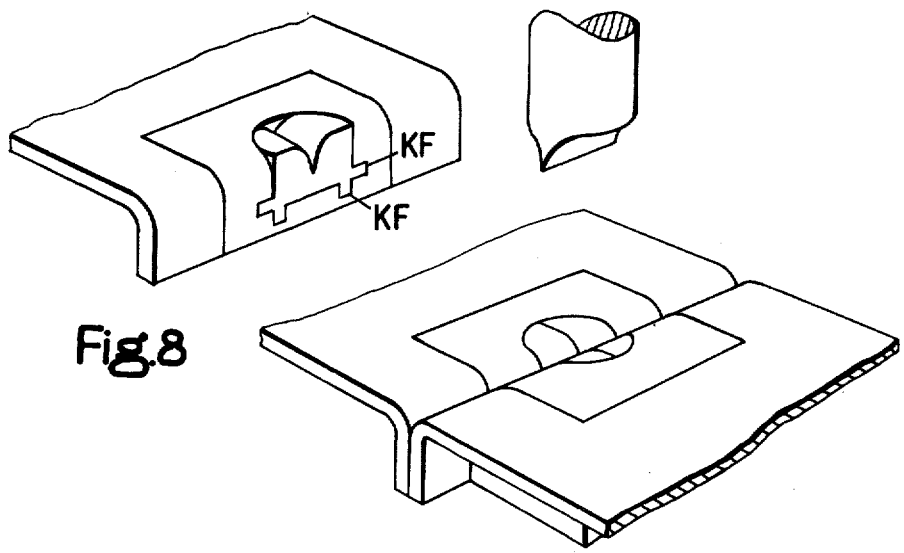

In FIG. 7 the fastening arrangement is manually operable, in FIGS. 8, 9, and 10 by a suitably bladed screwdriver and in FIGS. 11 and 12, by a crescent or socket wrench. There are other aspects of these embodiments; for example, the fastening arrangement of FIG. 10 is made of rolled and pierced sheet metal. The fastening arrangement of FIG. 11 is operable from either side of the parts being fastened together.

FIG. 13 shows a number of alternative arrangements for mutual fastening of tubes and rods. The fastening arrangements generally denoted at 130, 131 and 132 are analogous to conventional flange joints. In 130, the axes of rotation of the individual fastening arrangements are tangential to the axis of the rod, in 131 they are radial, and 132 they are parallel. In 130 they are socket operated, in 131 by a screwdriver, and in 132 by a tommy-bar.

While the fastening arrangement indicated at 133 is a straightforward development of the FIG. 8 arrangement, the other arrangements illustrated in FIG. 13 display aspects of the invention not previously described. Thus in the arrangement indicated at 134, the solid of rotation is divided into four parts by a surface which is effectively two intersecting planes, the axis of rotation of the solid of rotation being coincident with the axes of the two rods being fastened together. Furthermore, the strength of the joint in torsion and diametral shear is not dependent upon the integrity of the parts of the solid of rotation. At 135, the surface defined by the juxtoposition of the rods to be fastened is tri-planar, while that part of the surface dividing the solid of rotation is mono-planar.

At 136, the fastening arrangement is such that three rods are fastened together, the solid of rotation being correspondingly divided into three parts along the three planes of intersection of the three rods.

At 133 and 137, the parts of the fastening arrangement are shaped to present a smooth exterior when the rods are fastened together. The arrangement at 132 shows that the surface dividing the solid of revolution need not be a plane.

FIG. 14 illustrates the application of the invention to the joining together of waveguide sections. In such an application, accurate location is as important as integrity of fastening, and this the invention readily provides.

FIG. 15 shows a self-sealing fluid coupling utilising the principles of the invention. The two halves of the coupling are shown fastened together in perspective view in FIG. 15 (a) and separated and partly cut away, in perspective, in FIG. 15 (b). The coupling has two identical halves each comprising a housing 150 each having connected thereto two fluid bearing tubes 151. The two parts of the solid of rotation which fasten together the halves of the coupling are denoted at 152 in FIG. 15 (b). The means for rotating the two parts 152 differs from the preceding embodiments in which it is a unitary part of or rigid with the parts. The means to rotate each part 152 comprises a semi-annular member 153 mounted in the housing 150 for movement about its axis which is coincident with the axis of the solid of rotation as shown in cross-section in FIG. 15 (c). From the position shown in FIG. 15 (b) (and with the halves of the coupling placed together) initial rotation of the members 153 causes one end of each of the members 153 to enter the opposite housing 150 in order to provide positive location. (Ridging or knurling of the outer edges of the members 153 causes them to act like a thumb-wheel). A short arcuate slot 154 in each member allows this initial motion to take place without corresponding movement of the parts 152. Thereafter the end of the slot 154 engages a pin 155 in the part 152 and causes the parts 152 to rotate into a position in which the two halves of the coupling are securely fastened together. Each part 152 contains a passage 156 which, when the parts 152 are rotated to fasten the coupling, align with the terminations of the tubes 151 in each housing 150, as shown diagrammatically in FIG. 15 (e). Because the passages 156 in each part 152 lie at different levels therein, there is no connection between adjacent tubes 151 when the coupling is opened [FIG. 15 (d)]. If desired, such cross-connection on uncoupling could be provided by having the passages at the same levels in each part, as shown diagrammatically in FIGS. 16 (a) and 16 (b) which correspond to FIGS. 15 (d) and 15(e). The '0' rings 157 ensure proper fluid-tight sealing at all times.

FIG. 17 illustrates another form of gas (or liquid) coupling particularly suitable for use with portable gas consuming appliances, e.g. portable gas fires, oxygen masks, compressed air powered tools, and the like, or for example, for pressurising beer kegs, or for supplying intermittently used water hoses and lubrication systems. The coupling comprises a fixed housing 170 having an internal passage 171 coupled to a supply line 172. The housing 170 mounts one part 173 of a solid of rotation, the other part 174 being mounted in a removable housing 175. A hose 176 by which the portable appliances (not shown) is to be supplied is connected to the removable housing 175 and communicates with a passage 177 therein. The part 174 has a handle 178 by which it may be manually rotated, and surface along which the solid of rotation is divided to form the two parts 173 and 174 is such that a key 179 is formed on the part 174 and a corresponding slot 180 formed on the part 173. FIG. 17 (b) is an oblique view of the part 174 separated from its housing 175, and FIG. 17 (c) shows the appearance of the removable part of the coupling when separated from the fixed part of the coupling.

When the two parts of the coupling are juxtaposed [FIG. 17 (d)] such that the key 179 engages the slot 180, and the handle 178 is twisted through half a revolution, both parts 173 and 174 will be rotated by this amount, and a passage 181 in the part 173 will link the passages 171 and 177, allowing gas or liquid to flow from the supply line 172 to the hose 176 as shown by the arrows in FIG. 17 (e).

FIG. 18 shows the application of the invention to interlocking blocks which may be utilised as childrens toys. The blocks are generally cubic [FIG. 18 (a)] and are comprised of six identical pieces of which one is shown in FIG. 18 (b). These pieces may be welded or glued together or fastened together by the arrangements of the invention. Each face of the block mounts half of a solid of rotation 182 which in use forms an entire solid of rotation with an identical part in a juxtaposed block, as shown in FIG. 18 (c). Each part 182 has a hollow center which is square in cross section so that it may be turned by a tool 184. A shoulder 186 on the tool 184 cooperates with an internal shoulder 188 on the block to ensure that the tool 184 can only be withdrawn when it has been properly rotated through the required quarter turn.

What is claimed is:

1. A fastening system comprising a pair of semi-cylindrical body parts which may be brought together in face to face relationship to form a cylindrical fastener which is symmetrical about a center axis of rotation, said cylinder having a predetermined height measured along said axis, first and second mutually perpendicular annular key flanges integrally formed on each body part adjacent one end thereof, each of said flanges having a thickness which is much less than said height, said first annular key flange extending away from said body perpendicularly with respect to said axis, said second annular key flange extending parallel to said axis, a plurality of object parts to be fastened together along predetermined surfaces thereof, each object part having an arcuate semi-cylindrical raceway formed therein with internal raceway contours which are exactly complementary to the external contours on said fastener body parts, and the raceways in said object parts fitting together to form a single composite cylindrical raceway when said object parts are brought together in a mating face to face relationship, whereby said two body parts of said fastener span and join said semi-circular raceways to securely interconnect said two object parts when said fastener is partially rotated.

2. The fastening system of claim 1 wherein the top of said body is flush with the top of said object when said fastener body is in said raceway, and rotating means for enabling said body to be turned by a tool.

3. The fastening system of claim 2 wherein said rotating means comprises spring loaded pin means mounted in each of said body parts, the top of said pin means being normally flush with the top of said body part and in a depressed gripping position when pressed off normal against said bias by a tool, and detent means associated with said pin means for locking said fastener body when said pin is in said normal position and unlocking said body when said pin is off normal.

4. The fastening system of claim 2 wherein said rotating means comprises a socket formed in the top of said body, and a tool having an end which fits into said socket.

5. The fastening system of claim 2 wherein said rotating means comprises a tool, a pin and a cooperating socket for receiving said pin, said pin and socket being mutually and complementarily formed in said body and said tool.

* * * * *